United States Patent [19]

Mazloom et al.

[11] Patent Number: 4,696,448
[45] Date of Patent: Sep. 29, 1987

[54] TISSUE BOX HOLDER

[76] Inventors: Abolfazl Mazloom; Mazloom, Ahmad; Manoochehr Mazloom; Iraj Mazloom, all of 900 S. Kilbourne Rd., Columbia, S.C. 29205

[21] Appl. No.: 806,980

[22] Filed: Dec. 2, 1985

[51] Int. Cl.[4] .............................................. A47K 1/08
[52] U.S. Cl. ........................... 248/311.2; 248/DIG. 2
[58] Field of Search .......... 248/311.2, DIG. 2, 311.3, 248/309.1, 302, 297.3

[56] References Cited

U.S. PATENT DOCUMENTS

| 1,294,563 | 2/1919 | Stone | 248/311.2 X |
|---|---|---|---|
| 1,930,314 | 10/1933 | Healy et al. | 248/297.3 X |
| 2,278,011 | 3/1942 | Murdock | 248/311.2 X |
| 2,726,837 | 12/1955 | Jameson | 248/311.2 X |
| 2,826,334 | 3/1958 | Musler | 248/311.2 X |
| 2,887,216 | 5/1959 | Hargraves | 248/311.2 X |
| 3,053,495 | 9/1962 | Schmier | 248/222.4 X |
| 3,356,429 | 12/1967 | Davis | 248/222.4 X |
| 3,482,810 | 12/1969 | Bailey | 248/311.2 |
| 3,685,777 | 8/1972 | Dema | 248/DIG. 5 X |
| 3,801,056 | 4/1974 | Brody | 248/DIG. 5 X |
| 3,827,664 | 8/1974 | Larson | 248/DIG. 5 X |
| 3,843,085 | 10/1974 | Castro | 248/DIG. 5 X |
| 3,917,207 | 11/1975 | Quigley | 248/311.2 |
| 3,982,717 | 9/1976 | Pavelle et al. | 248/DIG. 5 X |
| 3,986,318 | 10/1976 | McConnell | 248/222.4 X |
| 4,258,464 | 3/1981 | Ullman | 248/222.4 X |

*Primary Examiner*—Ramon O. Ramirez
*Attorney, Agent, or Firm*—Benoni O. Reynolds

[57] ABSTRACT

An apparatus which utilizes a wire holder, attached by a bracket to the visor support in the middle of the front windshield of most current model automobiles, to support a standard tissue box in an inverted position. A universal bracket having a tube, two coil springs and a plurality of circular and oval holes, supports the wire holder and the tissue box encased therein against the ceiling, out of the way of the occupants, yet handy for easy access to the tissues. The bracket is spring loaded so as permit the replacement of the tissue box by merely rotating the holder downwards, inserting a new tissue box and then releasing the holder upwards.

3 Claims, 5 Drawing Figures

U.S. Patent  Sep. 29, 1987  4,696,448
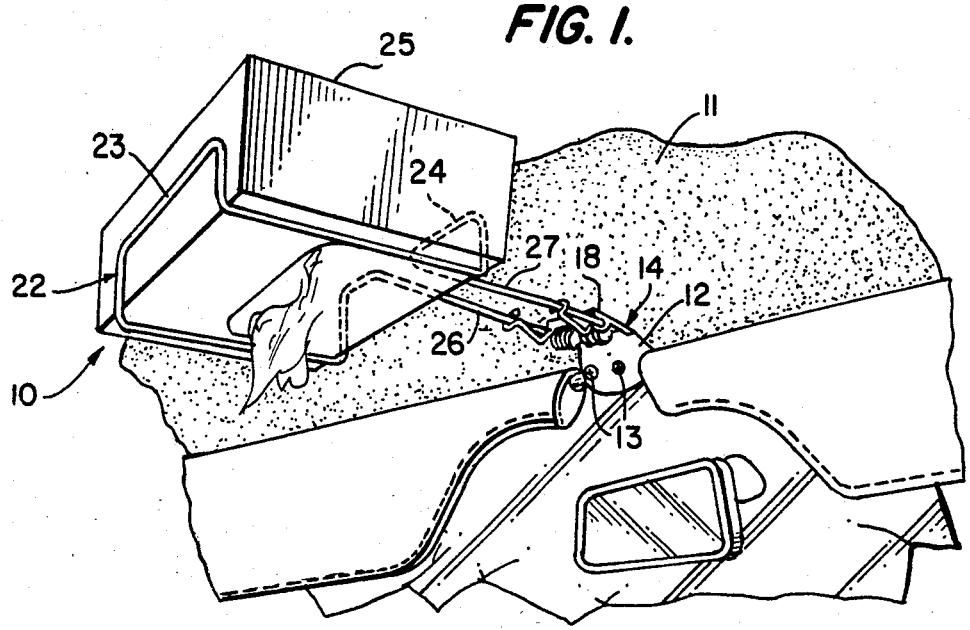
FIG. 1.
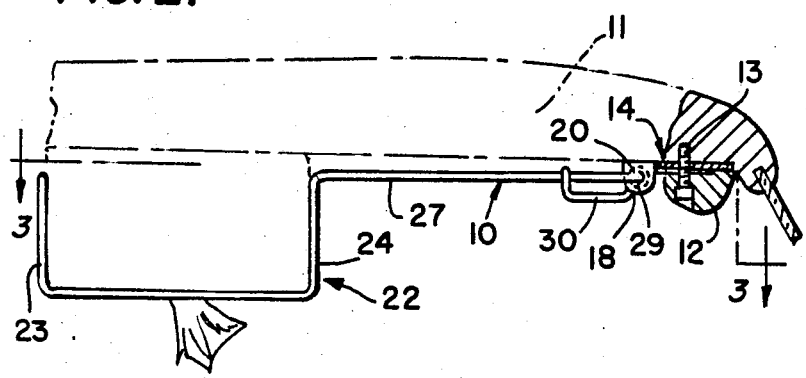
FIG. 2.
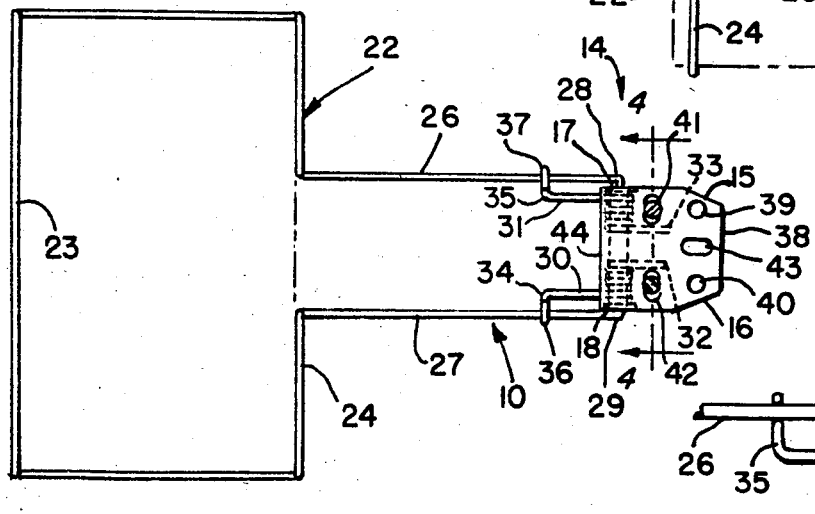
FIG. 3.
FIG. 4.
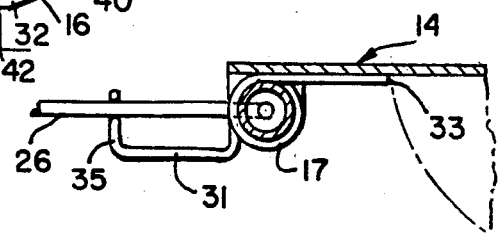
FIG. 5.

TISSUE BOX HOLDER

BACKGROUND OF THE INVENTION (1) Field of Invention

This invention relates to tissue dispensers for automobiles and is especially suited for attachment to the visor holder of late model automobiles.

(2) Description of the Prior Art

In the prior art, tissue box holders for automobiles were often crude devices for clamping or strapping a tissue box to the back of a visor or on the glove compartment door. Some devices required an exterior metal box and when in use would block the view of the occupant using it. Several of the overhead devices utilized the visor bracket or the rod holding the rear view mirror for a supporting structure. When spring loaded, the devices usually used a single spring or the device itself was made of spring steel wire.

Drawbacks in the prior art were the obstruction of views, the need for special brackets or adapters, the need for special tools, the inaccessibilty to rear occupants, and the difficulty of replenishing the tissue. The present invention overcomes all of these objections with a simple, inexpensive, wire type holder which has a unique universal bracket for attaching the apparatus, with only a screwdriver, to the visor holder in the upper middle of the windshield.

SUMMARY OF THE INVENTION

The present invention is an apparatus for mounting, in an inverted position, a standard tissue box to a visor holder in the middle of the front windshield of an automobile. Most recent model automobiles have a visor holder mounted at that point to hold the non-swiveled ends of the visors so that the visors do not swing outward when in a stowed position. The present invention is spring loaded to keep the apparatus up against the ceiling, out of the way of the occupants, and yet easily accessible for retrieving a tissue when needed. Also, the spring loading makes it easy to replace the tissue box by pulling downward on the outer portion of the apparatus, replacing the tissue box and releasing the apparatus to spring upwardly into its installed position.

According to the preferred embodiment of the present invention the apparatus comprises:

a bracket, having bottom ends for attaching the bracket beneath the visor holder and having top ends pressed downwardly to form half circle ends, each half circle end having a hole centered therein, and a tube mounted between the half circle ends of the bracket to serve as a retainer, and a wire holder, rectangular in shape, having an upwardly extending portion at the front and a downwardly extending portion at the back of the wire holder, to slidably engage the sides of a standard tissue box, and having extending arms whose extreme ends are bent inwardly in the horizontal plane at a 90 degree angle and respectively pass through the centered holes of the opposing half circle ends and rest well within the opposing ends of the tube, and two coil springs, each coil spring wrapped around the opposite ends of the tube and each coil spring having an inside end, to engage the underside of the bracket, and having an outside end bent outwardly in the horizontal plane at a 90 degree angle, to form a hook, under tension, beneath and partially encircling one of the extending arms of the wire holder.

The bottom ends of the bracket are each tapered in the horizontal plane at an 80 degree angle with respect to the bottom edge of the bracket, for ease in inserting the bracket under the visor holder. Also the bracket has two circular holes located in the bottom portion of the bracket and has three oval holes, two of the oval holes being located in the top portion of the bracket and the third oval hole being located between the two circular holes.

OBJECTIVES OF THE INVENTION

The objectives of the present invention are to provide an apparatus for dispensing tissues in an automobile which:

(1) mounts safely out of the view of the occupants, yet is easily accessible;

(2) will hold a standard tissue box:

(3) permits tissues to be easily pulled down by occupants seated in the front or the rear of the automobile;

(4) can be easily attached to the visor holder of essentially all late model automobiles;

Other objectives and advantages of the present invention will be apparent during the course of the following detailed description.

BRIEF DESCRIPTION OF THE DRAWINGS

FIG. 1 is a perspective view from the right side of an apparatus constructed in accordance with the principles of the present invention, showing the wire holder, the standard tissue box and the universal bracket attached to the visor holder of a late model automobile.

FIG. 2 is a side elevational view of same present invention showing the manner in which the bracket is installed beneath the visor holder.

FIG. 3 is a plan view of the same present invention showing the perimeter of the wire holder and the arrangement of the circular and oval holes in the universal bracket to which the wire holder is attached.

FIG. 4 is a front sectional view of the present invention taken along line 4—4 of FIG. 3 looking in the direction of the arrows. Shown is the arrangement of the two coiled springs wrapped around the opposite ends of the tube.

FIG. 5 is a side sectional view taken along line 5—5 of FIG. 4 looking in the direction of the arrows, showing how one of the outside ends forms a hook beneath and partially encicling one of the extending arms.

DETAILED DESCRIPTION OF THE PREFERRED EMBODIMENT OF THE INVENTION

The apparatus for mounting a standard tissue box in an overhead position above the occupants of the front seat of an automobile is a relatively small unit which is easily and quickly installed behind the visor holder found in the middle of the windshields of most late model automobiles using only a screwdriver as a tool. Throughout the following detailed description of the present invention like reference numerals are used to denote like parts disclosed in the accompanying drawings, FIGS. 1-5.

As shown in FIG. 1, the apparatus, shown generally at reference numeral 10, is designed to fit along the ceiling 11 of an automobile (not shown) and to fasten easily beneath visor holder 12 and is held in place by screws 13. Indicated generally at reference numeral 14 is a universal bracket having bottom ends 15 and 16 for attaching bracket 14 beneath visor holder 12. Top ends of bracket 14 are press downwardly to form half circle ends 17 and 18 and each such end having a hole 19 and 20, ⅛ inches in diameter, respectively centered therein. Bracket 14 is preferably made of a 2 inches by 2 inches piece of sheet steel which is 1/32 inches in thickness.

Tube 21 is 1⅞ inches in length and ¼ inches in diameter, preferably made of steel. Tube 21 is mounted between half circle ends 17 and 18 of bracket 14, which ends are approximately 2 inches apart. Tube 21 serves as a retainer for the spring mechanism later described. Wire holder, shown generally at reference numeral 22, is rectangular in shape, preferably made of chrome plated wire, having a diameter of ⅛ inches, with a total overall length of 43½ inches. Wire holder 22 has an upwardly extending portion 23 at the front and a downwardly extending portion 24 at the back of wire holder 22 to slidably engage the sides of standard tissue box 25. Wire holder 22 is 7½ inches wide and its extended portions 23 and 24 are 4¾ inches apart and 2 inches in height and depth respectively. Wire holder 22 has extending arms 26 and 27, which are 5½ inches long and 2¼ inches apart, whose extreme ends 28 and 29 are bent inwardly, 1 inch, in the horizontal plane at a 90 degree angle and respectively pass through the ⅛ inch holes 19 and 20 of the opposing half circle ends 17 and 18 of tube 21 and rest well within the opposing ends of tube 21.

As best shown in FIGS. 3 and 4, two coil springs 30 and 31 are each wrapped around the opposite ends of tube 21. Coil spring 30 is wrapped around one end of tube 21 in a clockwise direction and coil spring 31 is wrapped around the opposite end of tube 21 in a counterclockwise direction. The overall length of the wire in each coil spring 30 and 31 is 14 inches with 8 coils. The length of each coil spring 30 and 31 wrapped around tube 21 is 7/12 inches and the diameter of each coil is ⅜ inches. Each coil spring 30 and 31 has an inside end, 32 and 33 respectively, to engage the underside of bracket 14 and has an outside end, 34 and 35 respectively, bent outwardly in the horizontal plane at a 90 degree angle, to form a hook, 36 and 37 respectively, under tension, beneath and partially encircling extending arms 27 and 26 respectively, of wire holder 22.

As shown in FIG. 3, bottom ends 15 and 16 of bracket 14 are each tapered in the horizontal plane at an 80 degree angle with respect to bottom edge 38 of bracket 14, for ease of inserting bracket 14 under visor holder 12. Bracket 14 has two circular holes 39 and 40 located in the bottom portion of bracket 14 and has three oval holes 41, 42 and 43, oval holes 41 and 42 being located in the top portion of bracket 14 and oval hole 43 being located between circular holes 39 and 40. Circular holes 39 and 40 are each located 5/12 inches from bottom edge 38 of bracket 14 and are 5/16 inches in diameter. Oval holes 41, 42 and 43 are each 3/16 inches wide by ½ inches long, oval holes 41 and 42 being located ¾ inches from top edge 44 of bracket 14. After tapering, bottom edge 38 of bracket 14 is 1¼ inches in width.

Bracket 14, with the aid of the spring mechanism described above, holds standard tissue box 25 against ceiling 11 of the automobile (not shown). Individual tissues can be easily pulled down from the secured standard tissue box 25 by passengers (not shown) whether seated in the front or the back of the automobile. Wire holder 22 can easily be pulled down for reloading apparatus 10 with a new standard tissue box 25 whenever a replenishment is required. The size and distribution of circular holes 39 and 40 and oval holes 41, 42 and 43 provide a universal type support which will fit the visor holder 12 of essentially all late model automobiles.

We claim:

1. An apparatus for mounting, in an inverted position, a standard tissue box to a visor holder in the middle of the front windshield of an automobile, which apparatus comprises:

a bracket, having bottom ends for attaching said bracket beneath said visor holder and having top ends pressed downwardly to form half circle ends, each half circle end having a hole centered therein, and a tube mounted between said half circle ends of said bracket to serve as a retainer, and a wire holder, rectangular in shape, having an upwardly extending portion at the front and a downwardly extending portion at the back of said wire holder, to slidably engage the sides of said standard tissue box and having extending arms whose extreme ends are bent inwardly in the horizontal plane at a 90 degree angle and repectively pass through the centered holes of said opposing half circle ends and rest well within the opposing ends of said tube, and two coil springs, each coil spring wrapped around the opposite ends of said tube and each coil spring having an inside end, to engage the underside of said bracket, and having an outside end bent outwardly in the horizontal plane at a 90 degree angle, to form a hook, under tension, beneath and partially encircling one of said extending arms of said wire holder.

2. The apparatus of claim 1 wherein said bottom ends of said bracket are each tapered in the horizontal plane at an 80 degree angle with respect to the bottom edge of said bracket, for ease in inserting said bracket under said visor holder.

3. The apparatus of claim 2 wherein said bracket has two circular holes located in the bottom portion of said bracket and has three oval holes, two of said oval holes being located in the top portion of said bracket and the third oval hole being located between said two circular holes.

* * * * *